(12) United States Patent  
Galperin et al.

(10) Patent No.: US 7,456,130 B2  
(45) Date of Patent: *Nov. 25, 2008

(54) REFORMING CATALYST WITH CHELATED PROMOTER

(75) Inventors: Leonid B. Galperin, Wilmette, IL (US); Frank S. Modica, Naperville, IL (US); Thomas K. McBride, Jr., Chicago, IL (US)

(73) Assignee: UOP LLC, Des Plaines, IL (US)

( * ) Notice: Subject to any disclaimer, the term of this patent is extended or adjusted under 35 U.S.C. 154(b) by 49 days.

This patent is subject to a terminal disclaimer.

(21) Appl. No.: 11/697,471

(22) Filed: Apr. 6, 2007

(65) Prior Publication Data

US 2007/0191222 A1     Aug. 16, 2007

Related U.S. Application Data

(62) Division of application No. 10/990,378, filed on Nov. 17, 2004, which is a division of application No. 10/113,125, filed on Mar. 29, 2002, now Pat. No. 6,872,300.

(51) Int. Cl.
*B01J 23/00* (2006.01)
*B01J 21/00* (2006.01)
*B01J 20/00* (2006.01)

(52) U.S. Cl. ............... 502/326; 502/327; 502/332; 502/333; 502/334; 502/339; 502/349; 502/355; 502/415; 502/439

(58) Field of Classification Search ......... 502/326, 502/327, 332, 333, 334, 339, 349, 355, 415, 502/439

See application file for complete search history.

(56) References Cited

U.S. PATENT DOCUMENTS

| | | | |
|---|---|---|---|
| 2,889,287 A | 6/1959 | Scott, Jr. | 252/455 |
| 3,632,503 A | 1/1972 | Hayes | 208/139 |
| 3,642,925 A | 2/1972 | Rausch | 260/668 A |
| 3,745,112 A | 7/1973 | Rausch | 208/139 |
| 3,759,841 A | 9/1973 | Wilhelm | 252/441 |
| 3,764,557 A | 10/1973 | Kluksdahl | 252/415 |
| 3,790,473 A | 2/1974 | Rausch | 208/139 |
| 3,801,498 A | 4/1974 | Rausch | 208/139 |
| 3,830,727 A | 8/1974 | Kluksdahl et al. | 208/139 |

(Continued)

FOREIGN PATENT DOCUMENTS

DE     179017 A     3/1979

*Primary Examiner*—Cam N. Nguyen  
(74) *Attorney, Agent, or Firm*—Maryann Maas

(57) ABSTRACT

A process for preparing a naphtha reforming catalyst has been developed. The process involves the use of a chelating ligand such as ethylenediaminetetraacetic acid (EDTA). The aqueous solution of the chelating ligand and a tin compound is used to impregnate a support, e.g., alumina extrudates. A platinum-group metal is also an essential component of the catalyst. Rhenium may also be a component. A reforming process using the catalyst has enhanced yield, activity, and stability for conversion of naphtha into valuable gasoline and aromatic products.

10 Claims, 2 Drawing Sheets

U.S. PATENT DOCUMENTS

| | | | | |
|---|---|---|---|---|
| 3,846,283 A | 11/1974 | Rausch | ........................ | 208/139 |
| 3,929,683 A | 12/1975 | Antos | .................... | 252/466 PT |
| 3,994,832 A | 11/1976 | Antos | ......................... | 252/464 |
| 4,087,351 A * | 5/1978 | Rausch | ........................ | 208/139 |
| 4,167,496 A * | 9/1979 | Antos et al. | ................. | 502/327 |
| 4,183,827 A * | 1/1980 | Adams et al. | ................ | 502/223 |
| 4,719,196 A | 1/1988 | Vogt et al. | ................... | 502/304 |
| 4,786,625 A * | 11/1988 | Imai et al. | .................... | 502/326 |
| 4,827,072 A * | 5/1989 | Imai et al. | .................... | 585/443 |
| 4,880,764 A * | 11/1989 | Imai et al. | .................... | 502/326 |
| 4,929,595 A | 5/1990 | Wu | ................................ | 505/1 |
| 4,973,779 A * | 11/1990 | Imai et al. | .................... | 585/444 |
| 5,166,121 A | 11/1992 | Khare et al. | ................ | 501/225 |
| 5,298,154 A | 3/1994 | Khare et al. | ................. | 208/139 |
| 5,482,910 A | 1/1996 | Bricker et al. | ................ | 502/300 |
| 5,744,682 A | 4/1998 | McBride, Jr. et al. | ........ | 585/728 |
| 5,883,039 A | 3/1999 | McBride, Jr. et al. | ........ | 502/327 |
| 6,015,485 A | 1/2000 | Shukis et al. | ................ | 208/112 |
| 6,153,090 A | 11/2000 | Le Peltier et al. | ............ | 208/137 |
| 6,200,927 B1 | 3/2001 | Shukis et al. | ................ | 502/355 |
| 6,291,394 B1 | 9/2001 | Shukis et al. | ................ | 502/355 |
| 6,306,795 B1 | 10/2001 | Ryan et al. | .................... | 502/346 |
| 6,872,300 B1 | 3/2005 | Galperin et al. | ............. | 208/138 |

* cited by examiner

REFORMING CATALYST WITH CHELATED PROMOTER

CROSS-REFERENCE TO RELATED APPLICATIONS

This application is a Division of copending application Ser. No. 10/990,378 filed Nov. 17, 2004, which in turn is a Division of application Ser. No. 10/113,125 filed Mar. 29, 2002, now U.S. Pat. No. 6,872,300 the contents of which are hereby incorporated by reference in their entirety.

BACKGROUND OF THE INVENTION

This invention relates to a process for preparing a catalyst. The process involves the use of a chelating ligand to form a tin chelate complex. The invention also relates to a reforming process using the catalyst which provides increased selectivity to gasoline components and aromatic products.

Catalytic reforming involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Process improvements in catalytic reforming thus are targeted toward enhancing those reactions effecting a higher yield of the gasoline fraction at a given octane number.

It is of critical importance that a catalyst exhibits the capability both to initially perform its specified functions efficiently and to perform them satisfactorily for prolonged periods of time. The parameters used in the art to measure how well a particular catalyst performs its intended function in a particular hydrocarbon reaction environment are activity, selectivity and stability. In a reforming environment, these parameters are defined as follows:

(1) Activity is a measure of the ability of the catalyst to convert hydrocarbon reactants to products at a designated severity level, with severity level representing a combination of reaction conditions: temperature, pressure, contact time, and hydrogen partial pressure. Activity typically is characterized as the octane number of the pentanes and heavier ("$C_5^+$") product stream from a given feedstock at a given severity level, or conversely as the temperature required to achieve a given octane number.

(2) Selectivity refers to the percentage yield of petrochemical aromatics or $C_5^+$ gasoline product from a given feedstock at a particular activity level.

(3) Stability refers to the rate of change of activity or selectivity per unit of time or of feedstock processed. Activity stability generally is measured as the rate of change of operating temperature per unit of time or of feedstock to achieve a given $C_5^+$ product octane, with a lower rate of temperature change corresponding to better activity stability, since catalytic reforming units typically operate at relatively constant product octane. Selectivity stability is measured as the rate of decrease of $C_5^+$ product or aromatics yield per unit of time or of feedstock.

Programs to improve performance of reforming catalysts are being stimulated by the reformulation of gasoline, following upon widespread removal of lead antiknock additive, in order to reduce harmful vehicle emissions. Gasoline-upgrading processes such as catalytic reforming must operate at higher efficiency with greater flexibility in order to meet these changing requirements. Catalyst selectivity is becoming ever more important to tailor gasoline components to these needs while avoiding losses to lower-value products. The major problem facing workers in this area of the art, therefore, is to develop more selective catalysts while maintaining effective catalyst activity and stability.

Reforming catalysts containing tin as platinum-group (or Group VIII) modifiers, along with optional third metal promoters such as rhenium, indium, gallium, iridium, etc., are well known in the art. For example, U.S. Pat. No. 3,830,727 discloses a process for catalytic reforming using a catalyst comprising a platinum, rhenium, and tin, along with a halogen and a halogen activation step. This catalyst is prepared by impregnating the support with the desired components. U.S. Pat. No. 6,153,090 discloses a process for catalytic reforming using a catalyst comprising at least one group VIII metal, at least one additional element selected from the group consisting of germanium, tin, lead, rhenium, gallium, indium, thallium, where the promoter element is added in the form of an organometallic carboxylate compound containing at least one organometallic bond such as tributyl tin acetate.

It is also known that chelating ligands can be used to impregnate metals onto a support. For example, U.S. Pat. No. 4,719,196 discloses preparing a catalyst using a solution containing ethylene diaminetetraacetic acid (EDTA), a noble metal and ammonia. U.S. Pat. No. 5,482,910, which is incorporated herein by reference thereto, discloses a process for preparing a catalyst using a mixed solution comprising EDTA, a noble metal, and a promoter metal, such as an alkali earth metal. U.S. Pat. No. 6,015,485 and U.S. Pat. No. 6,291,394 disclose a process for treating an existing catalyst with EDTA in order to create a bimodal mesopore structure with alumina at two different crystallite sizes. No references to applicants' knowledge disclose the use of EDTA or a related chelating agent to impregnate tin onto a catalyst support.

Accordingly, applicants have developed a process for preparing catalysts which involves the use of a tin chelate complex to impregnate the tin component. The process involves preparing a tin solution containing a chelating ligand such as EDTA. This solution is heated and then used to impregnate a refractory oxide support such as alumina. Before or after the chelated impregnation, another solution can be used to impregnate platinum-group metals and any other desired promoter metals such as rhenium. Preferably, the impregnation with the tin chelate is performed at basic conditions, while the impregnation of the other components is performed at acidic conditions. After impregnation, calcination and reduction provide the desired catalyst.

SUMMARY OF THE INVENTION

This invention relates to a naphtha reforming process, a catalyst for carrying out the naphtha reforming process, and a process for preparing a naphtha reforming catalyst. Accordingly, one embodiment of the invention is a process for preparing a naphtha reforming catalyst comprising: a) preparing a first aqueous solution containing a chelating agent and a tin compound; b) heating said first solution for a time of about 5 minutes to about 5 hours at a temperature of about 40° C. to about 100° C.; c) preparing a second aqueous solution containing a platinum-group compound and optionally a rhenium compound; e) impregnating a solid refractory oxide support with said first solution to give a first impregnated solid support; g) impregnating said first impregnated solid support with said second solution to give a second impregnated solid support; h) calcining the second impregnated solid support at a temperature of about 300° C. to about 850° C. for a time of about 10 minutes to about 18 hours to give a calcined catalyst; and i) reducing the calcined catalyst at a temperature of about 300° to about 850° C. for a time of about 30 minutes to about 18 hours under a reducing atmosphere, thereby providing said catalyst suitable for naphtha reforming.

In another embodiment, the invention relates to a process for the catalytic reforming of a naphtha feedstock which comprises contacting the feedstock at reforming conditions with a catalyst comprising a particulate inorganic oxide support having dispersed thereon a tin component, a platinum-group metal component, and optionally a rhenium component; the catalyst characterized in that the tin component is deposited on the support by impregnation using a tin chelate complex and is uniformly distributed throughout the support.

In a further embodiment, the invention relates to a catalyst effective for naphtha reforming comprising a particulate refractory inorganic oxide support having dispersed thereon a tin component in an amount of about 0.01 to about 0.5 mass-% on an elemental basis, a platinum component in an amount of about 0.01 to about 2 mass-% on an elemental basis, and optionally a rhenium component in an amount of about 0.05 to about 5 mass-% on an elemental basis. The catalyst is characterized in that the tin is uniformly distributed and the platinum-group metal is uniformly distributed; the tin being dispersed on the support with an impregnation using a tin chelate complex.

Additional objects, embodiments and details of this invention can be obtained from the following detailed description of the invention.

DETAILED DESCRIPTION OF THE INVENTION

Figure 1:
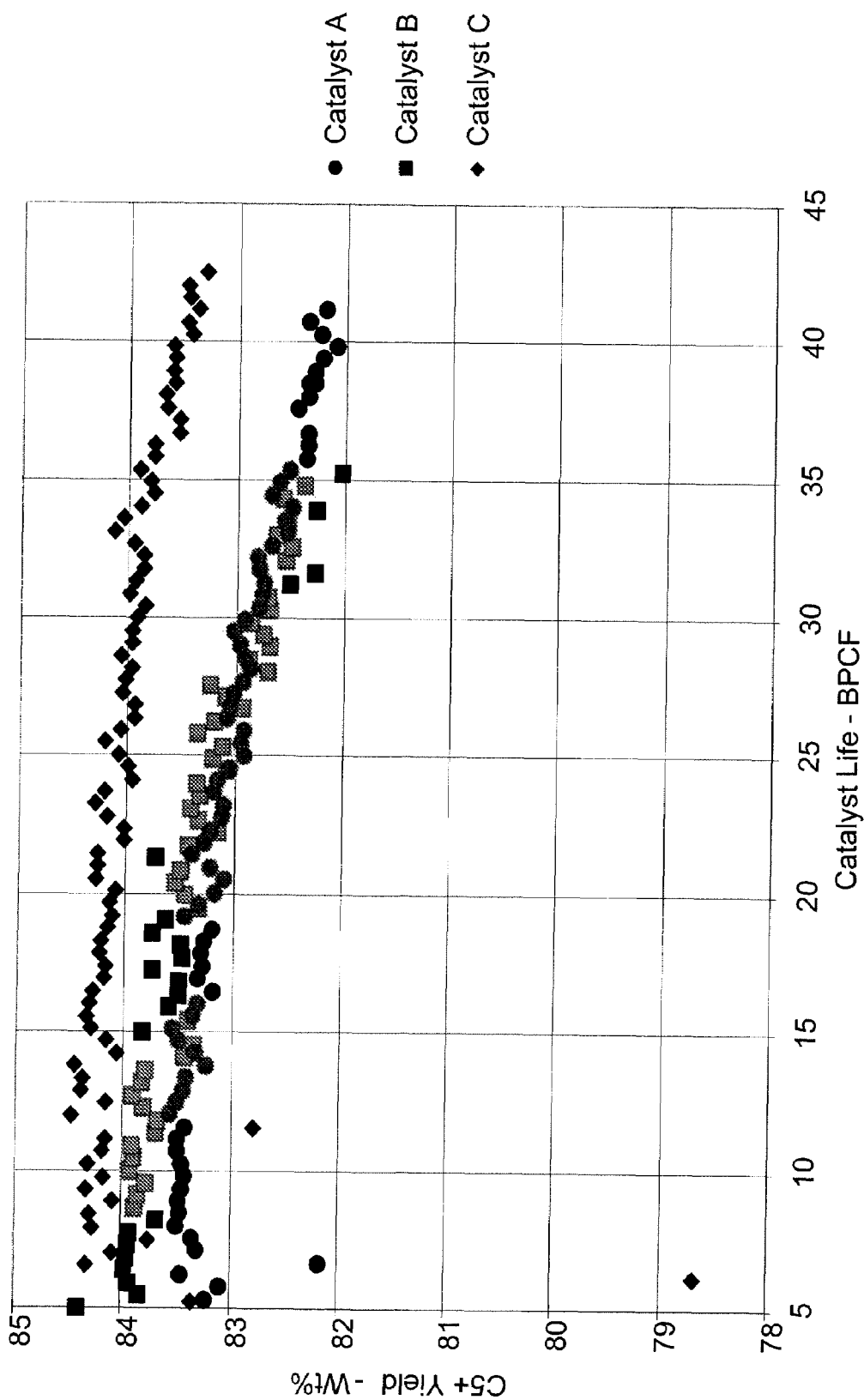
FIG. 1 presents plots of $C_5^+$ liquid yields as a function of catalyst life for various catalysts incorporating tin by different methods.

The catalyst of the present invention has particular utility as a hydrocarbon conversion catalyst. The hydrocarbon which is to be converted is contacted with the catalyst at hydrocarbon-conversion conditions, which include a temperature of from 40° to 1000° C., a pressure of from atmospheric to 200 atmospheres absolute and liquid hourly space velocities from about 0.1 to 100 hr$^{-1}$. The catalyst is particularly suitable for catalytic reforming of gasoline-range feedstocks, and also may be used for, inter alia, dehydrocyclization, isomerization of aliphatics and aromatics, dehydrogenation, hydro-cracking, disproportionation, dealkylation, alkylation, transalkylation, and oligomerization.

In the preferred catalytic reforming embodiment, hydrocarbon feedstock and a hydrogen-rich gas are preheated and charged to a reforming zone containing typically two to five reactors in series. Suitable heating means are provided between reactors to compensate for the net endothermic heat of reaction in each of the reactors. Reactants may contact the catalyst in individual reactors in either upflow, downflow, or radial flow fashion, with the radial flow mode being preferred. The catalyst is contained in a fixed-bed system or, preferably, in a moving-bed system with associated continuous catalyst regeneration. Alternative approaches to reactivation of deactivated catalyst are well known to those skilled in the art, and include semi-regenerative operation in which the entire unit is shut down for catalyst regeneration and reactivation or swing-reactor operation in which an individual reactor is isolated from the system, regenerated and reactivated while the other reactors remain on-stream. The preferred continuous catalyst regeneration in conjunction with a moving-bed system is disclosed, inter alia, in U.S. Pat. Nos. 3,647,680; 3,652,231; 3,692,496 and 4,832,921, all of which are incorporated herein by reference.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

Reforming conditions applied in the reforming process of the present invention include a pressure selected within the range of about 100 kPa to 7 MPa (abs). Particularly good results are obtained at low pressure, namely a pressure of about 350 to 2500 kPa (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 20 hr$^{-1}$, with a value in the range of about 1 to about 5 hr$^{-1}$ being preferred.

The hydrocarbon feedstock that is charged to this reforming system preferably is a naphtha feedstock comprising naphthenes and paraffins that boil within the gasoline range. The preferred feedstocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines, partially reformed naphthas, or dehydrogenated naphthas. Mixtures of straight-run and cracked gasoline-range naphthas can also be used to advantage. The gasoline-range naphtha charge stock may be a full-boiling gasoline having an initial ASTM D-86 boiling point of from about 40° to 80° C. and an end boiling point within the range of from about 160° to 220° C., or may be a selected fraction thereof which generally will be a higher-boiling fraction commonly referred to as a heavy naphtha—for example, a naphtha boiling in the range of 100° to 200° C. If the reforming is directed to production of one or more of benzene, toluene and xylenes, the boiling range may be principally or substantially within the range of 60° to 150° C. In some cases, it is also advantageous to process pure hydrocarbons or mixtures of hydrocarbons that have been recovered from extraction units—for example, raffinates from aromatics extraction or straight-chain paraffins—which are to be converted to aromatics.

It is generally preferred to utilize the present invention in a substantially water-free environment. Essential to the achievement of this condition in the reforming zone is the control of the water level present in the feedstock and the hydrogen stream which is being charged to the zone. Best results are ordinarily obtained when the total amount of water entering the conversion zone from any source is held to a level less than 50 ppm and preferably less than 20 ppm, expressed as weight of equivalent water in the feedstock. In general, this can be accomplished by careful control of the water present in the feedstock and in the hydrogen stream. The feedstock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the feedstock may be adjusted by suitable stripping operations in a fractionation column or like device. In some cases, a combination of adsorbent drying and distillation drying may be used advantageously to effect almost complete removal of water from the feedstock. Preferably, the feedstock is dried to a level corresponding to less than 20 ppm of $H_2O$ equivalent.

It is preferred to maintain the water content of the hydrogen stream entering the hydrocarbon conversion zone at a level of about 10 to about 20 volume ppm or less. In the cases where the water content of the hydrogen stream is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the naphtha feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metallic containing compositions, such as nickel or copper and the like. It is preferred that these feedstocks be treated by conventional catalytic pre-treatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalyst formulations known to the art including refractory inorganic oxide supports containing metals selected from the group comprising Group VI-B(6), Group II-B(12), and Group VIII (IUPAC 8-10) of the Periodic Table.

As stated, the present invention relates to a process for preparing a catalyst. The catalyst comprises a solid refractory oxide support having dispersed thereon a tin component, at least one platinum group metal component and optionally a modifier metal such as rhenium. The support can be any of a number of well-known supports in the art including aluminas, silica/alumina, silica, titania, zirconia, and zeolites. The aluminas which can be used as support include gamma alumina, theta alumina, delta alumina, and alpha alumina with gamma and theta alumina being preferred. Included among the aluminas are aluminas which contain modifiers such as tin, zirconium, titanium and phosphate. The zeolites which can be used include: faujasites, zeolite beta, L-zeolite, ZSM-5, ZSM-8, ZSM-11, ZSM-12 and ZSM-35. The supports can be formed in any desired shape such as spheres, pills, cakes, extrudates, powders, granules, etc. and they may be utilized in any particular size.

One way of preparing a spherical alumina support is by the well known oil drop method which is described in U.S. Pat. No. 2,620,314 which is incorporated by reference. The oil drop method comprises forming an aluminum hydrosol by any of the techniques taught in the art and preferably by reacting aluminum metal with hydrochloric acid; combining the hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and ammoniacal solutions to further improve their physical characteristics. The resulting aged and gelled spheres are then washed and dried at a relatively low temperature of about 80° to 260° C. and then calcined at a temperature of about 455° to 705° C. for a period of about 1 to about 20 hours. This treatment effects conversion of the hydrogel to the corresponding crystalline gamma alumina. If theta alumina is desired, then the hydrogel spheres are calcined at a temperature of about 950° to about 1100° C.

An alternative form of carrier material is a cylindrical extrudate, preferably prepared by mixing the alumina powder with water and suitable peptizing agents such as HCl until an extrudable dough is formed. The amount of water added to form the dough is typically sufficient to give a loss on ignition (LOI) at 500° C. of about 45 to 65 mass-%, with a value of 55 mass-% being preferred. The acid addition rate is generally sufficient to provide 2 to 7 mass-% of the volatile-free alumina powder used in the mix, with a value of 3 to 4 mass-% being preferred. The resulting dough is extruded through a suitably sized die to form extrudate particles. These particles are then dried at a temperature of about 260° to about 427° C. for a period of about 0.1 to 5 hours to form the extrudate particles. It is preferred that the refractory inorganic oxide comprises substantially pure alumina having an apparent bulk density of about 0.6 to about 1 g/cc and a surface area of about 150 to 280 $m^2/g$ (preferably 185 to 235 $m^2/g$, at a pore volume of 0.3 to 0.8 cc/g). A typical substantially pure alumina has been characterized in U.S. Pat. Nos. 3,852,190 and 4,012,313 as a by-product from a Ziegler higher alcohol synthesis reaction as described in Ziegler's U.S. Pat. No. 2,892,858.

A Group IVA(IUPAC 14) metal component is an essential ingredient of the catalyst of the present invention. Of the Group IVA(IUPAC 14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. Preferably, a substantial portion of the Group IVA(IUPAC 14) metal exists in the finished catalyst in an oxidation state above that of the elemental metal. The Group IVA(IUPAC 14) metal component, which is preferably tin, optimally is utilized in an amount sufficient to result in a final catalytic composite containing about 0.01 to about 5 mass-% metal, calculated on an elemental basis, with best results obtained at a level of about 0.1 to about 0.5 mass-% metal.

The Group IVA(IUPAC 14) metal or metals are dispersed onto the desired support as follows. First, an aqueous solution of a chelating ligand and at least one soluble, decomposable metal promoter compound is prepared to give a promoter metal chelate complex. Preferably, the metal compound is a tin compound. More preferably, the tin compound is a tin salt. Examples of suitable tin salts or water-soluble compounds of tin include without limitation stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, stannic oxalate, stannic acetate and the like compounds. The utilization of a tin salt in the form of a chloride compound, such as stannous or stannic chloride is particularly preferred since it facilitates the incorporation of both the tin component and at least a minor amount of a halogen component in a single step. Highly preferred is a salt with tin having a plus two oxidation state.

The chelating ligands which can be used in the process of this invention include amino acids which upon decomposing do not leave overly detrimental components on the support, e.g., sulfur. Specific examples of these amino acids include ethylenediaminetetraacetic acid, nitrilotriacetic acid, N-methylaminodiacetic acid, iminodiacetic acid, glycine, alanine, sarcosine, α-aminoisobutyric acid, N,N-dimethylglycine, α,β-diaminopropionate, aspartate, glutamate, histidine, and methionine.

The chelate-metal complex solution, which is preferably a chelate-tin complex solution, is heated for a time of about 5 minutes to about 5 hours at a temperature of about 40° to about 100° C. or its boiling point. The ratio of chelating ligand to the metal salt will vary from about 1 to about 8 and preferably from about 1.5 to about 4.

The chelate-metal solution described above may also contain a basic compound selected from the group consisting of ammonium hydroxide and quaternary ammonium compounds having the formula $NR_1R_2R_3R_4^+X^-$ where $R_1$, $R_2$, $R_3$, $R_4$ are each separately methyl, ethyl, propyl, butyl or t-butyl and X is hydroxide. The purpose of adding one or more of these basic compounds is to adjust the pH of the solution in order to vary the distribution of the metals. That is, in some cases it may be desirable to have a uniform distribution of the metals whereas in other cases a greater concentration on the surface may be desirable. Further, the distribution of the IVA(IUPAC 14) metal may be different from the distribution of the platinum-group or other promoter metal. For the present invention, it is preferred that the tin component and platinum-group components are uniformly distributed throughout the catalyst.

The chelate-metal complex solution is now used to deposit the metal onto the support by means well known in the art. Examples of said means include spray impregnation and evaporative impregnation. Spray impregnation involves taking a small volume of the mixed solution and spraying it over the support while the support is moving. When the spraying is over, the wetted support can be transferred to other apparatus for drying or finishing steps.

In one embodiment of the invention, the refractory oxide support is first impregnated with the tin chelate complex, and then impregnated with a platinum-group component. In another embodiment of the invention, the tin chelate complex is impregnated after the platinum-group component. Note that the impregnation steps may overlap as well. Preferably, once at least 80 mass-% of the platinum-group component has been impregnated onto the support then immediately thereafter impregnation with a tin chelate complex can begin. Alternatively, when two distinct impregnation procedures are performed then the support may be dried and/or calcined in between procedures as needed under the drying and calcination conditions listed hereinafter. Preferably, the calcination after the first distinct impregnation is sufficient to convert the tin to a tin-oxide compound.

An essential ingredient of the catalyst is a dispersed platinum-group component. This platinum-group component may exist within the final catalytic composite as a compound such as an oxide, sulfide, halide, oxyhalide, etc., in chemical combination with one or more of the other ingredients of the composite or as an elemental metal. It is preferred that substantially all of this component is present in the elemental state and is uniformly dispersed within the support material. This component may be present in the final catalyst composite in any amount which is catalytically effective, but relatively small amounts are preferred. Of the platinum-group metals which can be dispersed on the desired support, preferred metals are rhodium, palladium, platinum, and platinum being most preferred. Platinum generally comprises about 0.01 to about 2 mass-% of the final catalytic composite, calculated on an elemental basis. Excellent results are obtained when the catalyst contains about 0.05 to about 1 mass-% of platinum.

This platinum component may be incorporated into the catalytic composite in any suitable manner, such as coprecipitation or cogelation, ion-exchange, or impregnation, in order to effect a uniform dispersion of the platinum component within the carrier material. The preferred method of preparing the catalyst involves the utilization of a soluble, decomposable compound of platinum to impregnate the carrier material. For example, this component may be added to the support by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, etc. The utilization of a platinum chloride compound, such as chloroplatinic acid, is preferred since it facilitates the incorporation of both the platinum component and at least a minor quantity of the halogen component in a single step. Best results are obtained in the preferred impregnation step if the platinum compound yields complex anions containing platinum in acidic aqueous solutions. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum compounds; however, in some cases, it may be advantageous to impregnate the carrier material when it is in a gelled state.

Rhenium is an optional metal promoter of the catalyst. The platinum and rhenium components of the terminal catalytic composite may be composited with the refractory inorganic oxide in any manner which results in a preferably uniform distribution of these components such as coprecipitation, cogelation, coextrusion, ion exchange or impregnation. Alternatively, non-uniform distributions such as surface impregnation are within the scope of the present invention. The preferred method of preparing the catalytic composite involves the utilization of soluble decomposable compounds of platinum and rhenium for impregnation of the refractory inorganic oxide in a relatively uniform manner. For example, the platinum and rhenium components may be added to the refractory inorganic oxide by commingling the latter with an aqueous solution of chloroplatinic acid and thereafter an aqueous solution of perrhenic acid. Other water-soluble compounds or complexes of platinum and rhenium may be employed in the impregnation solutions. Typical decomposable rhenium compounds which may be employed include ammonium perrhenate, sodium perrhenate, potassium perrhenate, potassium rhenium oxychloride, potassium hexachlororhenate (IV), rhenium chloride, rhenium heptoxide, and the like compounds. The utilization of an aqueous solution of perrhenic acid is preferred in the impregnation of the rhenium component.

As heretofore indicated, any procedure may be utilized in compositing the platinum component and rhenium component with the refractory inorganic oxide as long as such method is sufficient to result in relatively uniform distributions of these components. Accordingly, when an impregnation step is employed, the platinum component and rhenium component may be impregnated by use of separate impregnation solutions or, as is preferred, a single impregnation solution comprising decomposable compounds of platinum component and rhenium component. It should be noted that irrespective of whether single or separate impregnation solutions are utilized, hydrogen chloride, nitric acid, or the like acid may be also added to the impregnation solution or solutions in order to further facilitate uniform distribution of the platinum and rhenium components throughout the refractory inorganic oxide. Additionally, it should be indicated that it is generally preferred to impregnate the refractory inorganic oxide after it has been calcined in order to minimize the risk of washing away valuable platinum and rhenium compounds; however, in some cases, it may be advantageous to impregnate refractory inorganic oxide when it is in a gelled, plastic dough or dried state. If two separate impregnation solutions are utilized in order to composite the platinum component and rhenium component with the refractory inorganic oxide, separate oxidation and reduction steps may be employed between application of the separate impregnation solutions. Additionally, halogen adjustment steps may be employed between application of the separate impregnation solutions. Such halogenation steps will facilitate incorporation of the catalytic components and halogen component into the refractory inorganic oxide.

It may be desirable to use the methods of U.S. Pat. No. 5,482,910, which has been incorporated by reference, to use chelating agents to incorporate the platinum-group and/or rhenium components in a dual component, or co-impregnation type manner along with a chelate tin complex, or independent of the complex.

Irrespective of its exact formation, the dispersion of platinum component and rhenium component must be sufficient so that the platinum component comprises, on an elemental basis, from about 0.01 to about 2 mass-% of the finished catalytic composite. Additionally, there must be sufficient rhenium component present to comprise, on an elemental basis, from about 0.01 to about 5 mass-% of the finished composite.

In addition to the catalytic components described above, other components may be added to the catalyst. For example, a modifier metal selected from the group consisting of germanium, lead, indium, gallium, iridium, lanthanum, cerium, phosphorous, cobalt, nickel, iron and mixtures thereof may be added to the catalyst.

One particular method of evaporative impregnation involves the use of a steam-jacketed rotary dryer. In this method the support is immersed in the impregnating solution which has been placed in the dryer and the support is tumbled by the rotating motion of the dryer. Evaporation of the solution in contact with the tumbling support is expedited by applying steam to the dryer jacket. The impregnated support is then dried at a temperature of about 60° to about 300° C. and then calcined at a temperature of about 300° to about 850° C. for a time of about 30 minutes to about 18 hours to give the calcined catalyst. Finally, the calcined catalyst is reduced by heating the catalyst under a reducing atmosphere, preferably dry hydrogen, at a temperature of about 300° to about 850° C. for a time of about 30 minutes to about 18 hours. This ensures that the metal is in the metallic or zerovalent state.

An optional step in the process of this invention involves halogenation, which is preferably oxychlorination, of the reduced catalyst described above. If such a step is desired, the catalyst is placed in a reactor and a gaseous stream containing a halogen, which is preferably chloride or chlorine, is flowed over the catalyst at a flow rate of about 0.9 kg/hr to about 18.1 kg/hr, at a temperature of about 300° to about 850° C. for a time of about 10 minutes to about 12 hours. The gaseous stream can be a hydrogen chloride/chlorine stream, a water/HCl stream, a water/$Cl_2$ stream or a chlorine stream. The purpose of this step is to provide optimum dispersion of the Group III and provide a certain amount of halide, preferably chloride, on the final catalyst. The halogen content of the final catalyst should be such that there is sufficient halogen to comprise, on an elemental basis, from about 0.1 to about 10 mass-% of the finished composite.

Optionally, the catalytic composite may be subjected to a presulfiding step. The optional sulfur component may be incorporated into the catalyst by any known technique.

The following examples are presented in illustration of this invention and are not intended as undue limitations on the generally broad scope of the invention as set out in the appended claims.

EXAMPLE 1

Tin was added to the support when as part of the forming process called extrusion, or preferably co-extrusion. 2500 g of alumina powder (commercially available under the trade names Catapal B and/or Versal 250) was added to a mixer. A solution was prepared using 60.8 g nitric acid (67.5% $HNO_3$) with 220 g deionized water, followed by the addition of 5.91 g of tin tartrate, and the solution was stirred. The solution was added to the alumina powder in the mixer, and mulled to make a dough suitable for extrusion. The dough was extruded through a die plate to form extrudate particles. The extrudate particles were dried at on a belt calciner operating with a first zone at 370° C. for about 15 minutes and a second zone at 620° C. for about 30 minutes.

The extrudate particles were placed in a rotary evaporator and heated to 60° C. A solution comprising deionized water, hydrochloric acid, chloroplatinic acid, and perrhenic acid was added to the rotary evaporator and temperature was raised to 100° C. and the support rolled for 5 hours. Next the impregnated support was heated to a temperature of 525° C. in dry air. When the temperature was reached, an air stream containing HCl and $Cl_2$ was flowed through the catalyst for 6 hours. Finally, the catalyst was reduced by flowing pure hydrogen over the catalyst at a temperature of 510° C. for 2.5 hours.

Analysis of the catalyst showed it to contain 0.25 mass-% Pt and 0.25 mass-% Re and 0.1 mass-% Sn. The platinum, rhenium and tin were evenly distributed throughout the support. This catalyst was identified as Catalyst A.

EXAMPLE 2

A spherical alumina support was prepared by the well-known oil dropping method, per U.S. Pat. No. 3,929,683. A tin component was incorporated in the support by commingling a tin component precursor with the alumina hydrosol and thereafter gelling the hydrosol. The catalyst particles were then dried at 600° C. for about 2 hours.

This support was placed in a rotary evaporator and heated to 60° C. A solution comprising deionized water, hydrochloric acid, chloroplatinic acid, and perrhenic acid was added to the rotary evaporator and temperature was raised to 100° C.

and the support rolled for 5 hours. Next the impregnated support was heated to a temperature of 525° C. in dry air. When the temperature was reached, an air stream containing HCl and $Cl_2$ was flowed through the catalyst for 6 hours. Finally, the catalyst was reduced by flowing pure hydrogen over the catalyst at a temperature of 510° C. for 2.5 hours.

Analysis of the catalyst showed it to contain 0.25 mass-% Pt and 0.25 mass-% Re and 0.3 mass-% Sn. The platinum, rhenium and tin were evenly distributed throughout the support. This catalyst was identified as Catalyst B.

EXAMPLE 3

A tin-EDTA solution was prepared by combining in a flask 300 g of deionized water, 1.42 g of ammonium hydroxide (concentration 29.6% NH40H), and 0.88 g of EDTA and stirred to dissolve EDTA. Then 0.3392 g of tin chloride (Sn $Cl_2*2H_2O$) was added while stirring the solution and heated to 60° C. to dissolve.

A second solution was prepared by the addition to 300 g of deionized water of 14.21 g of hydrochloric acid (37.6% HCl) and 17.48 ml of chloroplatinic acid ($H_2PtCl_6$ solution with a Pt concentration 27.6 mg/ml). Next was added 14.65 ml of perrhenic acid ($HReO_4$ solution with a Re concentration 32.8 mg/ml).

178.92 Grams of gamma alumina extrudates was placed in a rotary evaporator and heated to 60° C. The tin-EDTA solution was added to the gamma alumina in the rotary evaporator and the temperature was raised to 100° C. and the support rolled for 5 hours.

Then, the second solution was added to the rotary evaporator. The second solution was evaporated during 5 hours. Next the impregnated support was heated to a temperature of 525° C. in dry air. When the temperature was reached, an air stream containing HCl and $Cl_2$ was flowed through the catalyst for 6 hours. Finally, the catalyst was reduced by flowing pure hydrogen over the catalyst at a temperature of 510° C. for 2.5 hours.

Analysis of the catalyst showed it to contain 0.25 mass-% Pt and 0.25 mass-% Re and 0.1 mass-% Sn. The platinum, rhenium and tin were evenly distributed throughout the support. This catalyst was identified as Catalyst C.

EXAMPLE 4

Figure 2:
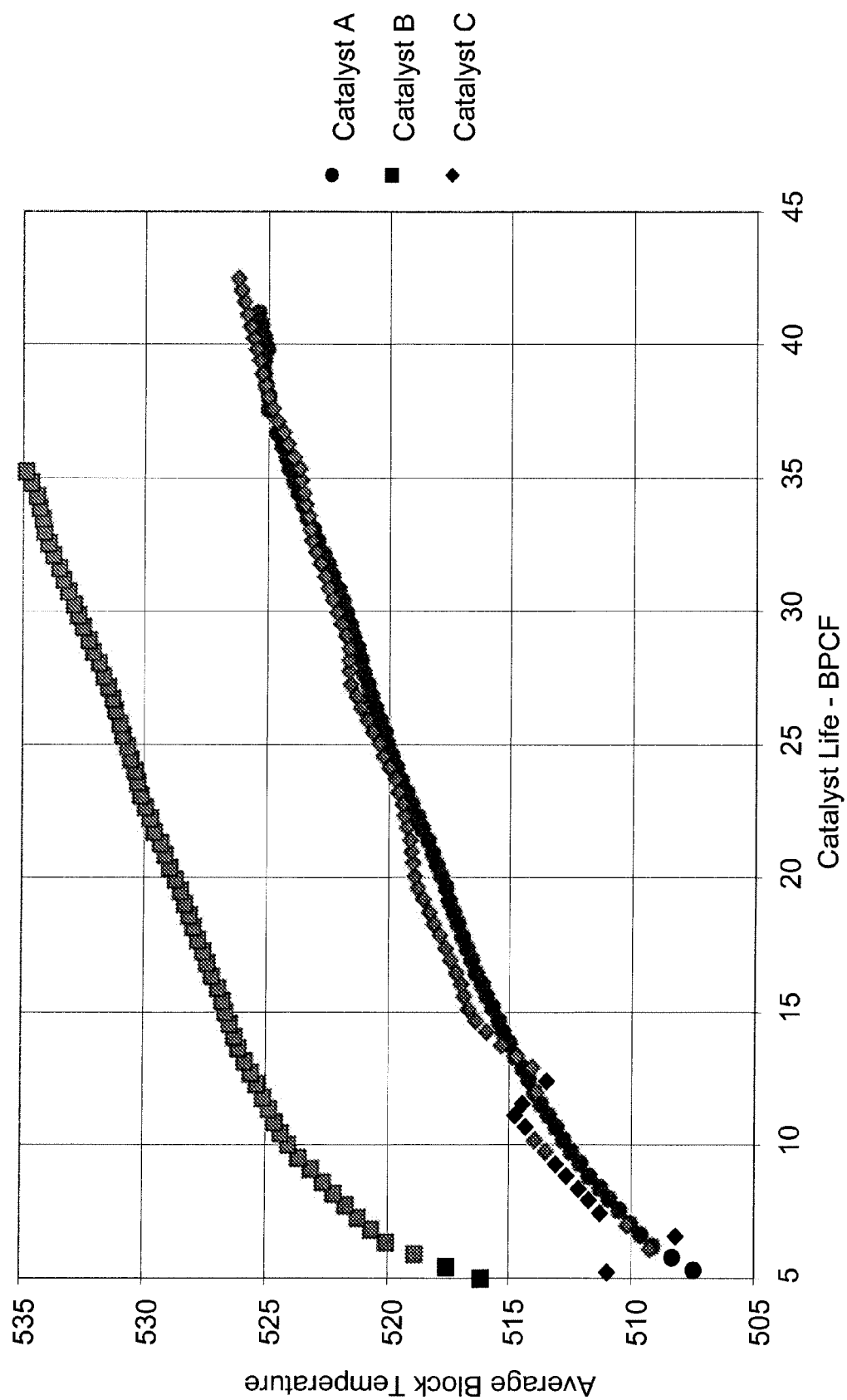
FIG. 2 presents plots of average reactor block temperatures corresponding to catalyst activity as a function of catalyst life for various tin incorporation methods.

Catalysts A, B, C were tested for catalytic reforming ability in a pilot plant using a typical naphtha feedstock available from the western United States as follows. Process conditions were selected to achieve a research octane number (RONC) of 100. Pressure was 1379 kPa (200 psig), hydrogen to hydrocarbon mole ratio was 1.5, and liquid hourly space velocity was 2.5 $hr^{-1}$. Catalyst life was measured by the prevailing industry standard using Barrels of feed Per Cubic Foot of catalyst, or BPCF, as shown in FIG. 1 and FIG. 2. First, FIG. 1 presents plots of $C_5^+$ liquid yields as a function of catalyst life. Second, FIG. 2 presents plots of average reactor block temperatures corresponding to catalyst activity as a function of catalyst life. The results from this test are summarized in the table below indicating equivalent start of run activity and yield at 12.5 BPCF.

TABLE

| Catalyst ID | Activity, ° C. | Yield, mass-% |
|---|---|---|
| A | 515 | 83.4 |
| B | 526 | 83.9 |
| C | 514 | 84.3 |

The data indicate that Catalyst C had the best yield and best activity.

The invention claimed is:

1. A process for preparing a catalyst suitable for naphtha reforming comprising a stannous tin component, a platinum-group metal component, and a rhenium component, having the stannous tin component uniformly distributed throughout a solid refractory oxide support, the process comprising:
   a) preparing a chelate-tin aqueous solution containing a chelating agent and a stannous tin compound;
   b) heating said chelate-tin solution for a time of about 5 minutes to about 5 hours at a temperature of about 40° to about 100° C.;
   c) preparing an acidic aqueous solution containing a platinum-group compound and a rhenium compound;
   d) impregnating a solid refractory oxide support with said acidic solution to give a first impregnated solid support;
   e) impregnating said first impregnated solid support with said chelate-tin solution to give a second impregnated solid support;
   f) calcining the second impregnated solid support at a temperature of about 300° to about 850° C. for a time of about 10 minutes to about 18 hours to give a calcined catalyst; and
   g) reducing the calcined catalyst at a temperature of about 300° to about 850° C. for a time of about 30 minutes to about 18 hours, under a reducing atmosphere, thereby providing said catalyst suitable for naphtha reforming.

2. The process of claim 1 wherein the platinum-group compound is chloroplatinic acid.

3. The process of claim 1 wherein the rhenium compound is perrhenic acid.

4. The process of claim 1 wherein the chelating agent is selected from the group consisting of ethylenediaminetetraacetic acid, nitrilotriacetic acid, N-methylaminodiacetic acid, iminodiacetic acid, glycine, alanine, sarcosine, α-aminoisobutyric acid, N,N-dimethylglycine, α,β-diaminopropionate, aspartate, glutamate, histidine, and methionine.

5. The process of claim 4 wherein the chelating agent is ethylenediaminetetraacetic acid.

6. The process of claim 1 further characterized in that the chelate-tin solution contains a basic compound selected from the group consisting of ammonium hydroxide and quaternary ammonium compounds having the formula $NR_1R_2R_3R_4^+X^-$ where $R_1$, $R_2$, $R_3$, $R_4$ are each separately methyl, ethyl, propyl, butyl or t-butyl and X is hydroxide.

7. The process of claim 1 further characterized in that after step (f), the catalyst is treated with a stream selected from the group consisting of $HCl/Cl_2$, water/HCl, water/$Cl_2$ and $Cl_2$ at a rate of 0.9 kg/hr to about 18.1 kg/hr, a temperature of about 300° C. to about 850° C. for a time of about 10 minutes to about 12 hours.

8. The process of claim 1 further characterized in that step (e) impregnation with chelate-tin solution occurs after about 80 mass-% of the acidic solution has been absorbed onto said refractory oxide.

9. The process of claim 1 wherein the chelating agent and stannous tin compound are present in a ratio of about 1 to about 8.

10. The process of claim 1 wherein the support is alumina.

* * * * *